April 8, 1952 J. E. TOM 2,591,746
DRAWBAR OPERABLE TRANSMISSION MECHANISM
Filed April 8, 1948 2 SHEETS—SHEET 1

INVENTOR.
BY John E. Tom
Wheeling and Trust,
Attorneys

INVENTOR.
BY John E. Tom
Woodling and Krost,
Attorneys

Patented Apr. 8, 1952

2,591,746

UNITED STATES PATENT OFFICE 2,591,746

DRAWBAR OPERABLE TRANSMISSION MECHANISM

John E. Tom, East Cleveland, Ohio

Application April 8, 1948, Serial No. 19,671

9 Claims. (Cl. 180—70)

My invention relates to a drive transmission and particularly to drive transmissions and controls therefor for tractors.

An object of my invention is to provide an improved transmission adapted to provide a variable drive wherein the speed and torque of the power from the motor is selectively variable in delivery to the driving wheels or other driven member of a device.

Another object is to provide for an efficient and economical adaptation of a variable speed device to a belt driven tractor.

Another object is the provision for efficiently mounting and controlling a variable-pitch sheave assembly.

Another object is to provide a unique and efficient arrangement on a tractor for mounting and controlling a variable-pitch sheave assembly associated with a V-belt transmission on the tractor.

Another object is the provision of an improved tension adjusting mechanism for a belt drive on a tractor or like vehicle.

Another object is to provide for a new and improved combination of mountings for a variable-pitch sheave assembly and tension adjusting mechanism.

Another object is the provision of a mechanism having a variable-pitch sheave assembly and a tension member for tightening and loosening the belt drive, which tension adjusting mechanism is arranged to adapt itself to variations in the position of the belt as the position of the sheave assembly is shifted.

Another object is the provision of means for providing a substantially uniform tension on the belt of a belt transmission by a tension member or idler pulley regardless of variable positions of the belt occasioned by variations in the transmission mechanism in shifting from one speed to other speeds.

Another object is to provide for manual control means for controlling a variable-pitch sheave assembly in a V-belt transmission and also for providing control means for a tension adjusting mechanism adapted to tighten and loosen the belt, the relative position of the tension adjusting mechanism to the belt remaining substantially the same throughout the variable position of the sheave assembly.

Another object is to provide for automatic control of the variable-pitch sheave assembly to so shift its operating position in accordance with the degree of draft applied to the drawbar of the tractor driven by the belt transmission.

Another object is the provision of means for both manually controlling and automatically controlling the variation in drive of a V-belt transmission.

Another object is the provision of means for manually setting the maximum desired speed of a tractor and automatic means for reducing the speed and increasing the torque on the driving wheels of the tractor upon there being an excessive draft on the tractor during operation.

Another object is the provision of automatic means for governing the variable speed drive, which automatic means commence to play only after the predetermined excess amount of draft is applied to the tractor to which said automatic means is assembled.

Another object is the provision of automatic means for governing the shiftable position of a variable-pitch sheave assembly mounted in the belt transmission of a tractor and dampening means for reducing or limiting operation of the automatic means by sudden and temporary changes in the draft imposed on the drawbar of the tractor.

Another object is the provision of manual and automatic means for controlling the variable drive transmission on a tractor, and which are particularly adapted to meet the operating conditions under which such a tractor operates, such as in agricultural plowing and cultivating.

Another object is the provision of a tractor mechanism and drive therefor especially adapted to assure the correct and required amount of torque on the tractor driving wheel in accordance with the conditions under which the tractor operates.

Other objects and a fuller understanding of my invention may be had by referring to the following description and claims, taken in conjunction with the accompanying drawing, in which:

Figure 1:
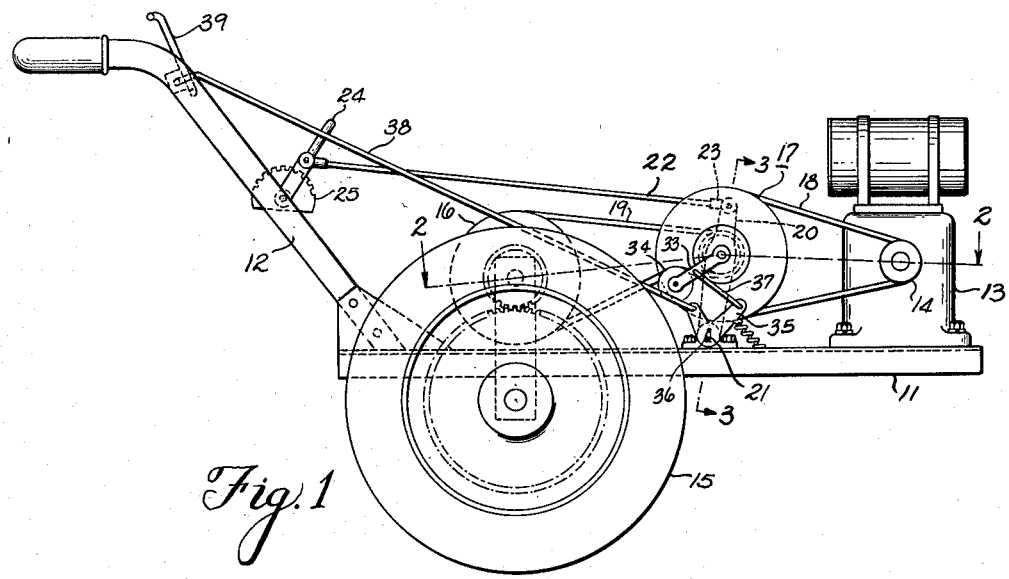
Figure 1 is a side view of a tractor incorporating my transmission mechanism.

For purposes of illustrating my invention I show a two-wheeled garden tractor having a frame 11 having rearwardly extending handle bars 12, the handles on the bars providing a control position for the operator of the tractor. A motor 13, such as a usual gasoline motor, is shown mounted on the forward end of the frame 11. The mounting of the motor on the frame is such that the position of the motor 13 may be shifted longitudinally of the tractor to a desired position and firmly secured to the frame by bolts or other suitable means. Extending from the motor and driven thereby is the pulley 14.

The tractor wheels 15 are in operative engagement with a wheel-driving pulley 16 through a suitable gear arrangement, so that revolving of the pulley 16 propels the tractor.

A drive transmission between the motor-driven pulley 14 and wheel-driving pulley 16 is provided by V-belt 18, V-belt 19 and an intermediate variable-pitch sheave assembly 17.

Sheave assembly 17 is rotatably carried on a shaft 31, which in turn is carried by a supporting arm member 20. The supporting arm member 20 is pivotally mounted to a pivot mounting 21 secured to the frame 11 of the tractor. The arm member 20, and with it the sheave assembly 17, is swung in an arc on the pivot provided by bolt 36 in pivot mounting 21. The arm 20 is swung forwardly and rearwardly of the tractor by a control rod 22 secured to the upper end of arm member 20 by a pivoted connection 23 in the form of a clevis and pin. The rearward end of control rod 22 is secured to a pivoted handle 24, and the fixed position of the handle 24 and rod 22 is selectively determined by an appropriate detent engaging notches in quadrant 25. Thus by moving the handle 24 forwardly the arm member 20 is swung forwardly, and by moving the handle 24 rearwardly the arm member 20 is swung rearwardly, and the position of the arm member 20 is held as desired by means of the detent in quadrant 25.

A belt-tensioning arrangement is provided by a tension pulley or idler 34 located below the lower portion of belt 19. The tension pulley 34 is rotatably carried by a bracket 33 which has its supported end rotatably carried by shaft 31 upon which the sheave assembly 17 rotates. By upward swinging of the bracket 33 on shaft 31 the tension pulley 34 is moved upwardly in tensioning engagement with belt 19.

To move the bracket 33 and tension pulley 34 up and down, a bellcrank 35 is pivotally mounted on bolt 36, upon which is also pivotally carried the arm member 20. The long forward branch of bellcrank 35 is pivotally connected with link member 37 which also has a pivotal connection with bracket 33. Thus, swinging of bellcrank 35 on the pivot provided by bolt 36 swings the bracket 33 upwardly and downwardly, the link member 37 being a rigid rod pulling and pushing the bracket 33 as bellcrank 35 is moved. Pivotally connected to the rearward and shorter branch of bellcrank 35 is another control rod 38 which leads back to adjusting handle 39. The handle 39 pivotally mounted on handle bar 12 may be swung into a fixed forward or fixed rearward position and thus move the control rod 38 forwardly or rearwardly. Upon moving control rod 38 rearwardly the bellcrank 35 is rotated to raise the tension pulley 34 upwardly in tensioning engagement with the belt 19. Upon moving control rod 38 in the opposite direction the tensioning pulley 34 is moved downwardly to belt-loosening position.

Figure 2:
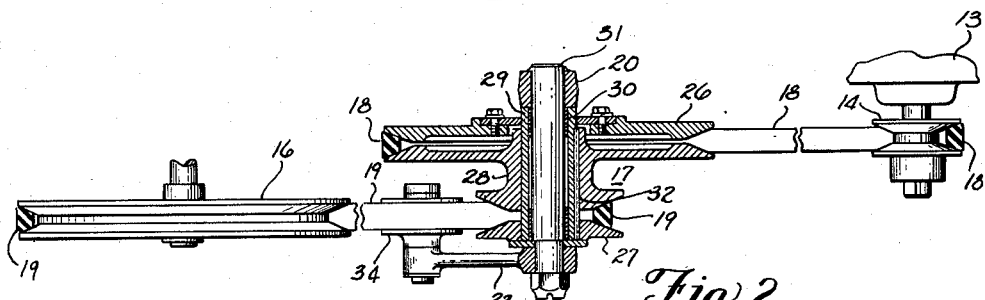
Figure 2 is an enlarged sectional view of the drive mechanism looking in the direction of the arrows 2—2 of Figure 1.
Figure 3:
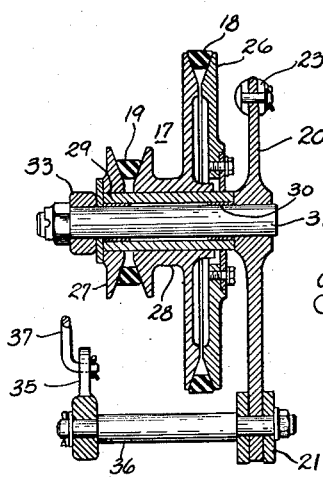
Figure 3 is another enlarged sectional view of my drive mechanism looking in the direction of the arrows 3—3 of Figure 1.

The detail of the variable-pitch sheave assembly 17, its mounting and association with the belts 18 and 19 is shown in enlarged detail in Figures 2 and 3. A sleeve 29 revolves around the shaft 31 secured to, and carried by the arm 20. Suitable bearings 30 provide a bearing surface between the revolving sleeve 29 and shaft 31. A large sheave part 26 is rigidly secured by suitable securing means to the sleeve 29 so as to revolve therewith. The large sheave part 26 is also so secured to the sleeve 29 as to remain in the same axial position, that is, the sheave part 26 does not move in an axial direction on shaft 31. A small sheave part 27 is also secured to sleeve 29 so as to revolve therewith, and is also secured to the sleeve against any axial shifting or moving of sheave part 27 in respect to shaft 31. Between sheave parts 26 and 27 is a movable or shiftable double-faced sheave part 28. One face of sheave part 28 is large and has a surface facing and cooperating with sheave part 26. The movable sheave part 28 also has a small faced surface which faces and cooperates with small sheave part 27. The intermediate sheave part 28 is keyed to the sleeve 29 by longitudinal key 32 so as to revolve with the sleeve 29. The mounting of the sheave part 28 on the sleeve 29 is such, however, that the intermediate sheave part 28 may move axially of shaft 31 toward and away from the fixed sheave parts 26 and 27.

The position of belts 18 and 19 in the pulleys formed by sheave parts 26, 27 and 28 is determined by the position of the shaft 31. Upon movement of shaft 31 forwardly of the tractor as in Figures 1, 2 and 3, belt 18 is positioned at the highest pitch or greatest circumference on sheave part 26 and the corresponding portion of sheave part 28, while belt 19, also being of V-shape, moves radially inward of the pulley formed by fixed sheave part 27 and the corresponding portion of sheave part 28 to the position shown in Figures 1, 2 and 3. In this position the ratio of the V-belt drive between pulleys 14 and 16 is for relatively slow speed and high torque. Upon moving shaft 31 rearwardly of the tractor by means of arm 20 and the control rod 22, the belt 18 moves radially inward of sheave part 26 and the corresponding portion of sheave part 28, and this moves or shifts the movable sheave part 28 toward sheave part 27 so as to force the V-belt 19 outwardly to a larger pitched pulley for greater circumference, and then the drive ratio between the motor and tractor wheels is at relatively high speed and low torque.

During variations in the drive ratio through shifting of the position of shaft 31, the position of belt 19 is varied by reason of the expansion or contraction of the effective circumference or pitch of the pulley provided by sheave part 27 and corresponding portion of sheave part 28. If the position of tension pulley 34 were in fixed position, such as in belt-tensioning position, the relative position of tension pulley 34 to belt 19 and the tension exerted thereon would vary as the drive ratio varied. However, by my arrangement for mounting the tension pulley 34, in the manner shown and described, the position of tension pulley 34 automatically adapts itself to changes in the position of belt 19 so that the relative position of tension pulley 34 to belt 19 remains substantially uniform throughout varying positions of sheave assembly 17. If the tension pulley 34 has been placed in tensioning position by handle 39 and rod 38, it remains in such tensioning position throughout the varying positions of sheave assembly 17 and modifications of the drive ratio in the transmission. If the tensioning pulley 34 has been moved to untensioned position by handle 39 and rod 38, it remains in such untensioned position throughout variations in the position of the sheave assembly 17 and changes in the drive ratio of the transmission. Thus the changes in the drive ratio may be easily and quickly made while the tractor is being propelled through shifting the position of handle 24, and the V-belt transmission remains in the same tension. This makes for great advantages in the operation of the tractor and permits a performance not otherwise obtainable.

Figure 5:
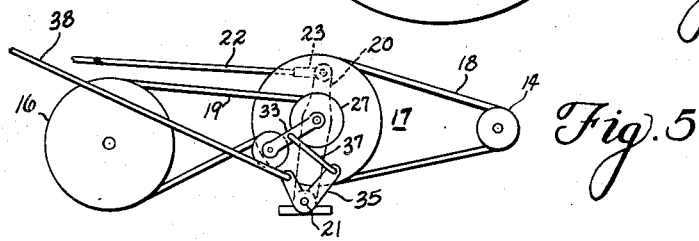
Figure 5 is a somewhat diagrammatical view of the drive mechanism shown in Figure 1, and shows the parts in one operating position wherein the drive ratio to the tractor wheels is such that there is a relatively low speed and high torque delivered to the driving wheels.
Figure 6:
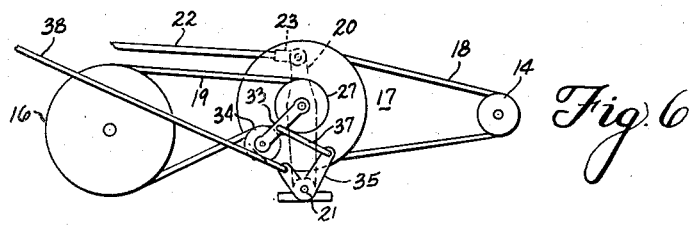
Figure 6 is a view somewhat similar to that of Figure 5, but in which the transmission is shifted in position so that the power delivered to the tractor driving wheel is relatively fast in speed and low in torque.
Figure 7:
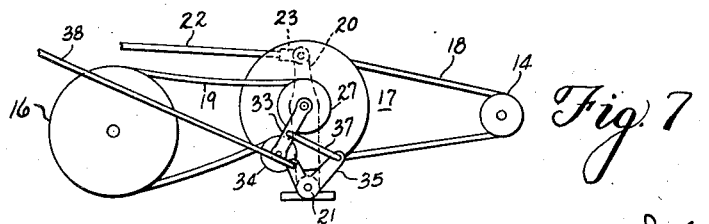
Figure 7 is a view somewhat like that of Figure 6 with the parts in approximately the same relative position, but in which the belt means is loosened by the lowering of the tension pulley.

Figures 5, 6 and 7, are somewhat diagrammatical in form and show the relative positioning of the parts of the device shown in Figure 1. In Figure 5 the sheave assembly is in a position for relatively low speed and high torque, the sheave assembly 17 having been moved forwardly by rod 22. The tension pulley 34 is up in tensioning position against the belt 19 so that the belt is in tension and there is transmission afforded between pulley 14 and pulley 16.

In Figure 6, the intermediate sheave assembly 17 has been moved to a position of relatively high speed and low torque, so that the belt 19 is moved out to greater pitch and larger circumference on the small sheave part 27. The bracket 33 carried on arm 20 has tilted down to move the tension pulley 34 slightly downwardly the correct amount to permit the belt 19 to move out to its proper position on the small sheave part 27 and at the same time to retain substantially the same tension on belt 19, and thus assuring the same engagement.

In Figure 7, the intermediate sheave assembly 17 is in the same position as in Figure 6, but the tension pulley 34 has been moved downwardly away from belt 19 so that belt 19 is loose and sloppy and no transmission is afforded through the belt 19. The tension pulley 34 was moved downwardly to the belt-loosening position by the crank arm 35 and link member 37 upon the forward movement of rod 38 to actuate the crank arm 35.

Figure 4:
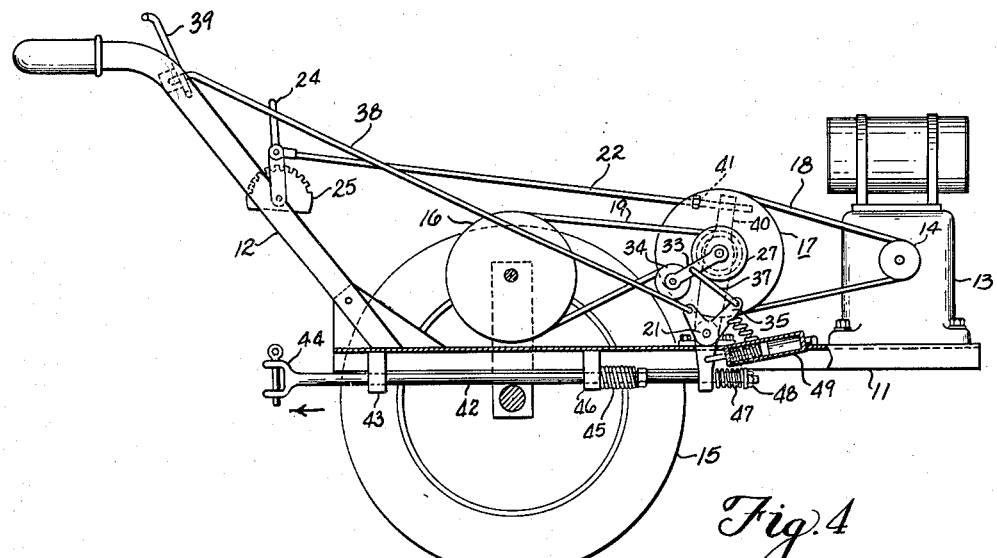
Figure 4 is a side view of a tractor incorporating a modified form of my drive mechanism in which there is embodied automatic means for varying the drive mechanism.

In Figure 4 I show a modified form of my apparatus in which is incorporated automatic control means for moving the intermediate sheave assembly 17. The supporting arm member 40 which carries the sheave assembly 17 is somewhat different from the arm 20 of Figure 1, in that a lower end of arm member 40 extends downwardly below the pivot provided by the bolt 36. The upper end of arm member 40 is also modified in that the forward end of rod 22 slidably engages in a hole or groove provided in the upper end of arm member 40, the connection 23 in the device of Figure 1 being omitted. A stop nut or limiting member 41 is secured to rod 22 at a spaced distance from its forward end. The size of the hole or groove in the upper end of arm member 40 through which rod 22 slidably fits is small enough that the upper end of arm member 40 will engage and be stopped by nut 41. The position of nut 41 forwardly or rearwardly of the tractor is determined by the handle 24. By moving the handle 24 rearwardly to move the rod 22 and nut 41 rearwardly, the arm member 40 is permitted to swing back to a relatively high speed position. The handle 24 and rod 22 may place the nut 41 forwardly to a desired position, and this position will determine the maximum speed position to which the sheave assembly 17 may move.

A drawbar 44 to which implements or other drawable devices may be secured is positioned rearwardly of the frame 11 and on a plane below the frame 11. There is secured to the drawbar 44 a long connecting rod 42 extending forwardly of the drawbar along and towards the front of the tractor intermediate the tractor wheels 15. Brackets 43 and 46 through which the rod 42 passes support the rod 42 and permit it to move forwardly and rearwardly relative to the brackets 43 and 46 and frame 11. A large coil spring 45 around the rod 42 is positioned in advance of bracket 46. The rearward end of the large coil spring 45 abuts against the bracket 46, and the forward end of the coil spring 45 is secured by suitable means, such as a collar and screw, to a fixed position on the rod 42. Thus, the coil spring 45 biases the rod 42 forwardly of the tractor and resiliently resists rearward movement of the rod 42 upon placing a draft on the drawbar 44. The coil spring 45 is normally in a partially compressed condition, and is such that it resists rearward draft on rod 42 beyond that of a predetermined degree. However, upon excessive draft beyond such a predetermined degree being applied to drawbar 44, the coil spring is compressed to the position shown in Figure 4 and permits the rod 42 to move to its rearward position shown in Figure 4. The arrow at the drawbar 44 indicates the draft on the drawbar sufficient to overcome the spring 45 to move the parts to the position indicated in Figure 4.

Rod 42 slidably fits in an opening in the lower end of arm member 40. There is a head 48 formed by a nut and washer on the forward end of rod 42. A relatively light spring 47 is carried on the rod 42 just back of the head 48 and abuts against the lower end of arm 40 to press the lower end of arm 40 rearwardly (and thus the upper end of arm 40 forward). The light spring 47 acts to cushion any quick movement of head 48 on rod 42 relative to the lower end of arm member 40. By means of the spring 47, the rearward force of head 48 as it is moved rearwardly by rod 42 is applied gradually and in a resilient manner against the lower end of arm 40.

A spring loaded dash-pot 49 has one end connected to the lower end of arm member 40 and another end secured to the frame 11. The dash-pot 49 acts as a dampening device and is designed to give this retarding or dampening effect in only one direction; that is, to resist violent or sudden movement of the lower end of arm 40 rearwardly by jerks and sudden excesses in draft on drawbar 44. The spring portion of dash-pot device 49 resiliently urges the lower end of arm member 40 forwardly, and thus the upper end of arm member 40 rearwardly toward the stop nut 41, to thus limit hunting and resiliently urge the sheave assembly 17 to a position of relatively high speed.

As seen from the view of Figure 4 which shows the parts when excessive draft has been applied to drawbar 44, the sheave assembly 17 has been swung forwardly to a position of relatively low speed and high torque. As soon as the excessive draft on drawbar 44 is eliminated the coil spring 45 forces the bar 42 forwardly to its normal position, and the upper end of arm member 40 may back into abutment with the stop nut 41 to the position of the maximum speed desired by the setting of handle 24.

This arrangement provides for automatic control of the transmission so that the speed and drive of the tractor is adapted to the character of the draft on the drawbar. When greater effort is required of the tractor, the V-belt transmission is automatically modified. However, sudden surges and jerks imposed on the drawbar, as in plowing when stones or roots are encountered, are provided for so that the changes are not radical in modifying the drive transmission. The response is prompt, but is not erratic. The manual control 24 sets the normal maximum speed at which it is desired to drive the tractor. When excessive draft beyond a predetermined amount is encountered, then the speed is automatically cut down and the required torque applied to the tractor wheel by the arrangement shown and described.

Although the invention has been described with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a driving mechanism for a tractor having a frame, a motor-driven pulley and a wheel-driving pulley carried by the frame, a variable-pitch sheave assembly, V-belt means operatively connecting said pulleys to said sheave assembly, and a drawbar carried by the frame, the combination of an arm member pivotally carried by said frame and carrying said sheave assembly, swinging movement of said arm member shifting the axis of said sheave assembly to modify the drive ratio of said pulleys, a connecting member operatively connecting said arm member and said drawbar to move said arm member upon rearward movement of said drawbar relative to said tractor, and biasing means carried by said frame and operatively engaging said connecting member for biasing said connecting member in one direction, the arrangement of said arm member, connecting and biasing means providing for movement of the arm member by said connecting member to shift the axis of said sheave assembly by a draft on said drawbar sufficient to overcome said biasing means.

2. In a driving mechanism for a tractor having a frame, a motor-driven pulley and a wheel-driving pulley carried by the frame, a variable-pitch sheave assembly, V-belt means operatively connecting said sheave assembly and said pulleys, movement of the axis of said sheave assembly modifying the drive ratio of said pulleys, and a movable drawbar carried by said frame, the combination of a movable supporting member carried by said frame for carrying said sheave assembly and shifting the axis of said sheave assembly, a connecting member operatively connected to said drawbar and arranged to operatively engage and move said supporting member upon rearward movement of said connecting member relative to said tractor, and biasing means carried by said frame and operatively engaging said connecting member, said biasing means biasing said connecting member forwardly of said tractor, the arrangement of said supporting member, connecting member and biasing means providing for the rearward movement of said connecting member in opposition to said biasing means and to move said supporting member upon application of a rearward draft on said drawbar sufficient to overcome said biasing means.

3. In a driving mechanism for a tractor having a frame, a V-belt power transmission, a variable-pitch sheave assembly for modifying the drive ratio of said V-belt transmission upon shift in axial position of said sheave assembly, and a movable drawbar carried by the frame, the combination of a movable support for said sheave assembly adapted to shift the axial position of the sheave assembly upon movement of said support, a connecting member operatively connecting said drawbar and said support to move said support upon rearward movement of said drawbar relative to said frame, and spring means operatively engaging said frame and connecting member and adapted to resiliently resist rearward movement of said connecting member relative to said frame by draft on said drawbar, draft on said drawbar in excess of an amount determined by said spring means moving said connecting member and support.

4. In a driving mechanism for a tractor having a frame, a V-belt power transmission, a variable-pitch sheave assembly for modifying the drive ratio of said V-belt transmission upon shift in axial position of said sheave assembly, and a movable draw member carried by the frame, the combination of a movable supporting member for said sheave assembly adapted to shift the axial position of the sheave assembly upon movement of said supporting member, a control member for manually moving said supporting member in a first direction, a connecting member operatively connecting said draw member and said supporting member, a resilient member operatively engaging said connecting member to resiliently resist rearward movement of said connecting member by draft on said draw member, said connecting member having a portion adapted to engage said supporting member and to move the supporting member in said first direction upon rearward movement of said connecting member, said resilient member being adapted to permit rearward movement of the connecting member upon application of a rearward draft on said draw member in excess of a predetermined amount.

5. In a driving mechanism for a tractor having a frame, a V-belt power transmission, a variable-pitch sheave assembly for modifying the drive ratio of said transmission upon a shift in axial position of said sheave assembly, and a movable drawbar carried by said frame, the combination of a movable supporting member for said sheave assembly adapted to shift the axial position of the sheave assembly upon movement of the supporting member, a control member for manually moving said supporting member in a first direction, a connecting member operatively connected to said drawbar, said connecting member having a portion adapted to engage said supporting member and to move the supporting member in said first direction upon rearward movement of said connecting member, resilient means resiliently resisting rearward movement of said connecting member and permitting rearward movement upon application of a predetermined excess of draft on said drawbar, and dampening means carried by the frame for dampening sharp movements of the supporting member upon sudden changes in draft on said drawbar.

6. In a driving mechanism for a tractor having a frame, a V-belt power transmission, a variable-pitch sheave assembly for modifying the drive ratio of said transmission upon a shift in axial position of said sheave assembly, and a movable drawbar carried by said frame, the combination of a movable supporting member for said sheave assembly adapted to shift the axial position of the sheave assembly upon movement of the supporting member, a control member for manually moving said supporting member in a first direction, a connecting member operatively connected to said drawbar, said connnecting member having a portion adapted to engage said supporting member and to move the supporting member in said first direction upon rearward movement of said connecting member, first resilient means resiliently resisting rearward movement of said connecting member and permitting rearward movement upon application of a predetermined excess of draft on said drawbar, second resilient means resiliently urging said support member in a second direction, and dampening means carried by the frame for dampening sharp movements of the supporting member upon sudden changes in draft on said drawbar.

7. In a tractor having a variable-drive transmission and a movable member connected to said variable-drive transmission for varying the same, and a drawbar, the combination of manual control means for limiting movement of said movable member in one direction, and automatic control means operatively connecting said movable member and said drawbar for automatically moving said movable member in an opposite direction by rearward draft on said drawbar, said automatic control means including resisting means for resisting action of said rearward draft less than that of a predetermined degree.

8. In a tractor having a variable-drive transmission, a movable member connected to said variable-drive transmission for varying the same, and a drawbar, the combination of manual means for limiting the movement of said movable member to a location for maximum speed ratio of said transmission, automatic means responsive to the draft on said drawbar for moving said movable member to decrease the ratio of said transmission, and resilient means for modifying the operation of said automatic means in accordance with the degree and sustainability of said draft.

9. In a tractor having a belt type variable-drive transmission, a movable member connected to said variable-drive transmission for varying the same, a belt tensioning member and a drawbar, the combination of manual means for limiting the movement of said movable member to a location for maximum speed ratio of said transmission, automatic means responsive to the draft on said drawbar for moving said movable member to decrease the speed ratio of said transmission, means for maintaining the tensioning position of said belt-tensioning member during movements of said movable member, and cushioning means for affecting the operation of said automatic means in accordance with the degree and sustainability of said draft.

JOHN E. TOM.

REFERENCES CITED

The following references are of record in the file of this patent:

UNITED STATES PATENTS

| Number | Name | Date |
|---|---|---|
| 571,395 | Pyott | Nov. 17, 1896 |
| 814,060 | Low | Mar. 6, 1906 |
| 1,187,224 | Agaronoff | June 13, 1916 |
| 1,279,547 | Hueber | Sept. 24, 1918 |
| 1,378,953 | Heylman | May 24, 1921 |
| 1,443,951 | George | Feb. 6, 1923 |
| 1,817,873 | Bready | Aug. 4, 1931 |
| 1,873,458 | Murnane | Aug. 23, 1932 |
| 2,079,351 | Judelshon | May 4, 1937 |